United States Patent [19]
Sherrod

[11] Patent Number: 5,438,791
[45] Date of Patent: Aug. 8, 1995

[54] POCKET HOLDER FOR SNELLED FISH HOOKS

[76] Inventor: Lois M. Sherrod, 330 E. Grove St., Stockton, Calif. 95204

[21] Appl. No.: 239,461

[22] Filed: May 9, 1994

[51] Int. Cl.6 .............................................. A01K 97/06
[52] U.S. Cl. ........................................ 43/57.2; 43/57.1
[58] Field of Search ................................ 43/57.1, 57.2

[56] References Cited

U.S. PATENT DOCUMENTS

| | | | |
|---|---|---|---|
| 258,393 | 5/1882 | Endicott | 43/57.2 |
| 726,509 | 4/1903 | Connor | 43/57.1 |
| 940,132 | 11/1909 | Creasey | 43/57.1 |
| 1,490,370 | 4/1924 | Figley | 43/57.2 |
| 1,979,475 | 11/1934 | Knettles | 43/57.2 |
| 2,008,026 | 7/1935 | MacMurray | 43/57.1 |
| 2,422,870 | 6/1947 | Willis | 43/57.2 |

*Primary Examiner*—Kurt Rowan

[57] ABSTRACT

Disclosed is a new pocket holder for snelled fish hooks for holding and storing fish hooks with leaders in a simple folder whereby the hook points are covered for safety and the leader lines are secured to prevent kinking and tangling. The holder comprises a generally rectangular semi-stiff thin panel having a lateral score line thereon defining two adjoining identical panel sections. The panel is foldable on the score line to provide closed and open positions. Two pair of parallel spaced apart slits extend through the center of at least one panel section to define two hook retaining strips therebetween. A pair of spaced apart holes extend through the at least one panel section proximal each corner thereof, the holes in each pair of holes being joined together by an arcuate slit to form a rounded oblong tab coplanar the panel section. Each tab is pivotally displaceable relative the plane of the panel section whereby the combination of tabs and panel section define a spool structure whereupon the leader may be wound.

6 Claims, 4 Drawing Sheets

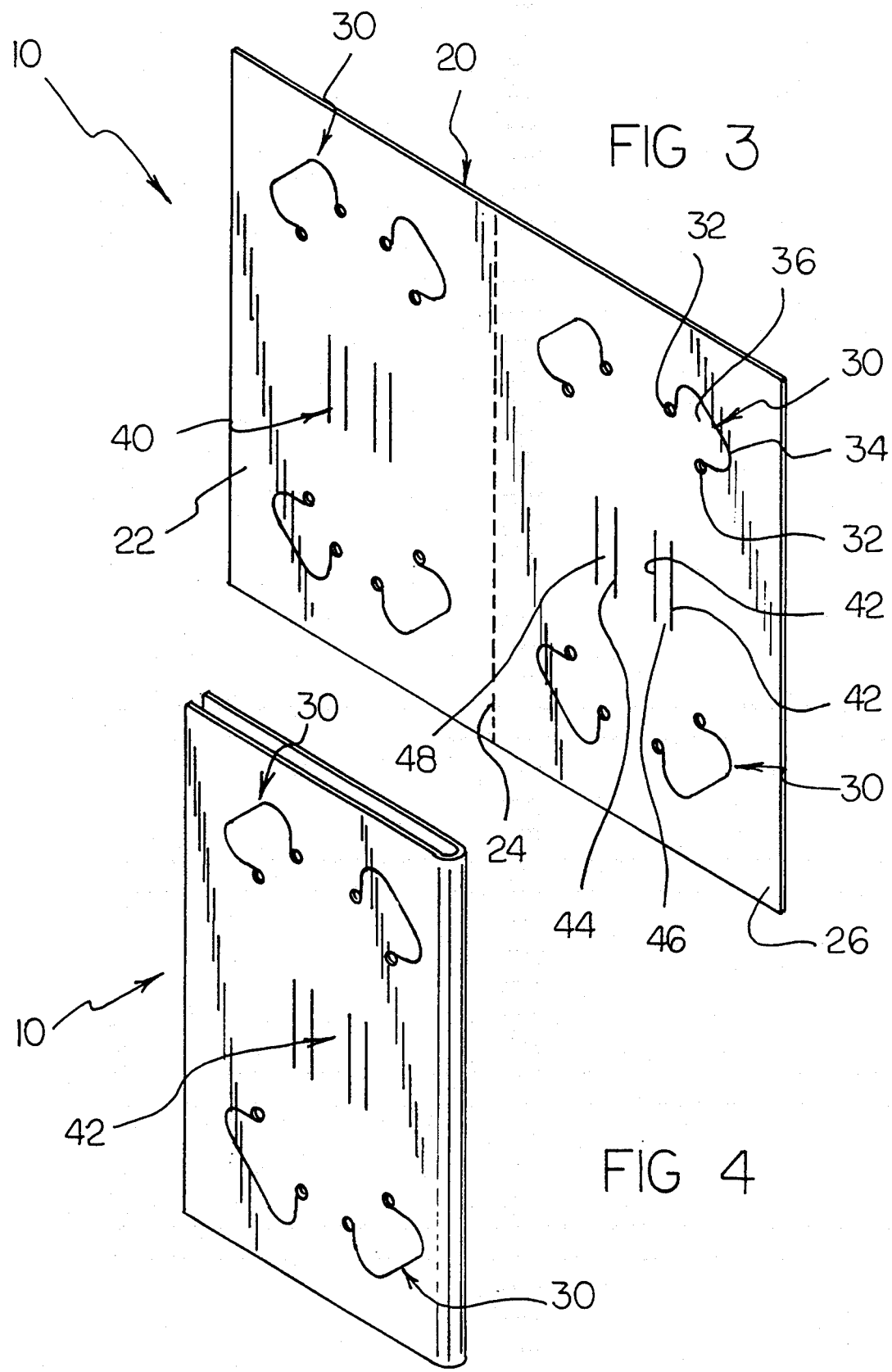

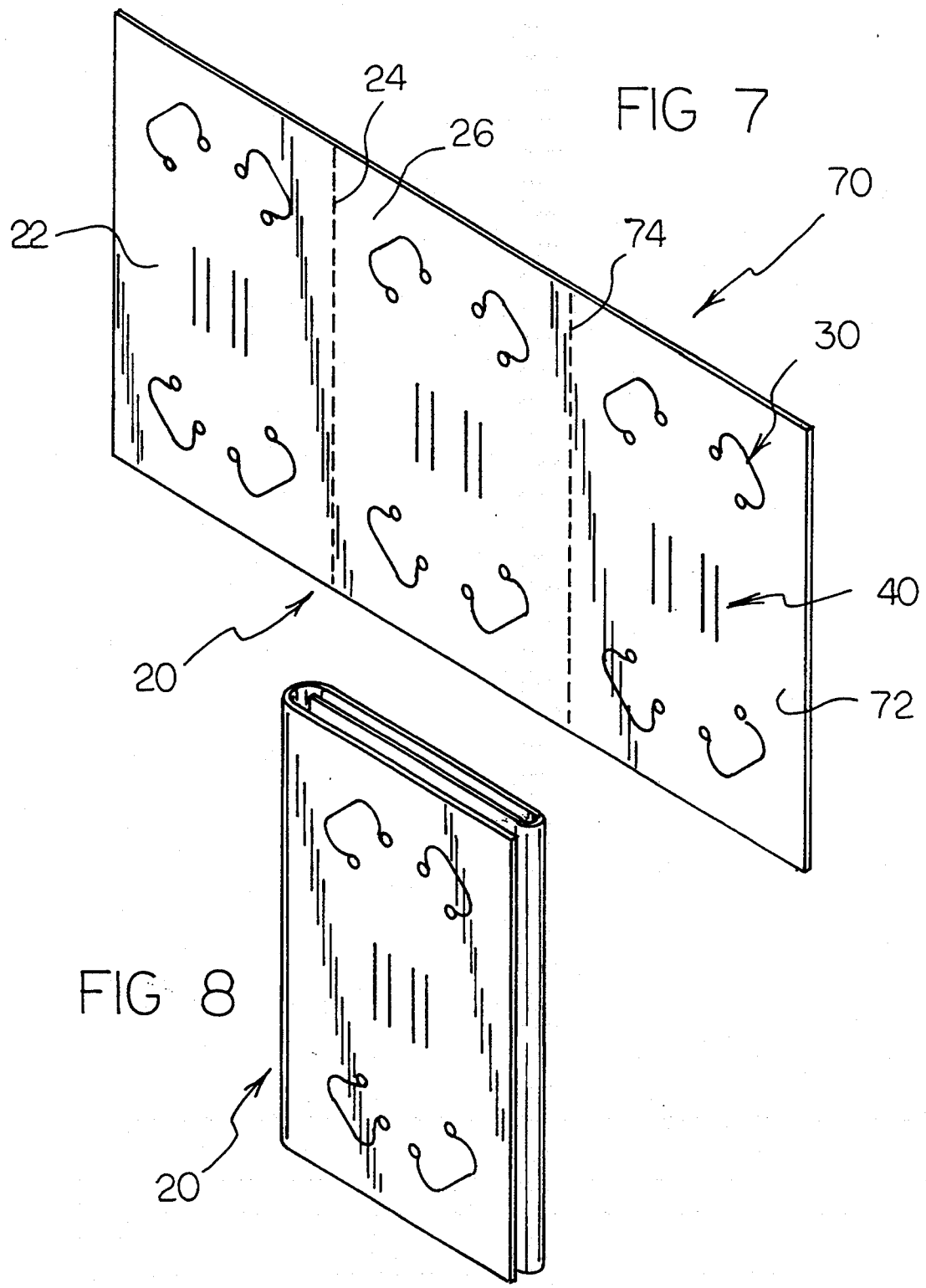

POCKET HOLDER FOR SNELLED FISH HOOKS

BACKGROUND OF THE INVENTION

1. Field of the Invention

The present invention relates to devices for holding and storing fish hooks and lures and more particularly pertains to a pocket holder for snelled fish hooks which may be adapted for holding and storing fish hooks with leaders in a simple pocket-sized folder whereby the hook points are covered for safety and the leader lines are secured to prevent kinking and tangling while simultaneously allowing easy removal of the hook without interfering with other stored hooks.

2. Description of the Prior Art

The use of devices for holding and storing fish hooks and lures is known in the prior art. More specifically, devices for holding and storing fish hooks and lures heretofore devised and utilized for the purpose of holding fish hooks in a safe and readily available manner are known to consist basically of familiar, expected and obvious structural configurations, notwithstanding the myriad of designs encompassed by the crowded prior art which have been developed for the fulfillment of countless objectives and requirements.

The present invention is directed to improving devices for holding fish hooks in a manner which is safe, secure, economical and aesthetically pleasing.

The prior art discloses a snelled hook, fly, and lure older as shown in U.S. Pat. No. 4,577,433 to Jones which consists of rigid fiberglass pages contained in a looseleaf type binder. U.S. Pat. Nos. 5,182,878 to Clark and 4,186,511 to Slacter both describe fish lure holders and U.S. Pat. No. 4,825,584 to Raley discloses a modular fish lure holder. While these devices fulfill their respective, particular objectives and requirements, the aforementioned patents do not disclose a pocket holder for snelled fish hooks. The Jones patent shows a rather complex device not suited for carrying in a shirt pocket. None of the inventions disclosed in the Clark, Slacter, or Raley patents show a way to secure the leader to prevent tangling and kinking.

U.S. Pat. No. 252,336 to Grippi, Jr., showing a fish hook and leader holder, is included for general interest.

In this respect, the pocket holder for snelled fish hooks according to the present invention substantially departs from the conventional concepts and designs of the prior art, and in so doing provides an apparatus primarily developed for the purpose of holding and storing fish hooks with leaders in a simple pocket-sized folder whereby the hook points are covered for safety and the leader lines are secured to prevent kinking and tangling while simultaneously allowing easy removal of the hook without interfering with other stored hooks.

Therefore, it can be appreciated that there exists a continuing need for a new pocket holder for snelled fish hooks which can be used for holding and storing fish hooks with leaders in a simple pocket-sized folder whereby the hook points are covered for safety and the leader lines are secured to prevent kinking and tangling while simultaneously allowing easy removal of the hook without interfering with other stored hooks. In this regard, the present invention substantially fulfills this need.

As illustrated by the background art, efforts are continuously being made in an attempt to develop devices for holding fish hooks in a safe and readily available manner. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of devices for holding and storing fish hooks and lures now present in the prior art, the present invention provides a new device for holding and storing fish hooks and lures wherein the same can be utilized for holding and storing fish hooks with leaders in a simple pocket-sized folder whereby the hook points are covered for safety and the leader lines are secured to prevent kinking and tangling while simultaneously allowing easy removal of the hook without interfering with other stored hooks. As such, the general purpose of the present invention, which will be described subsequently in greater detail, is to provide a new pocket holder for snelled fish hooks apparatus and method which has all the advantages of the prior art devices for holding and storing fish hooks and lures and none of the disadvantages.

The invention is defined by the appended claims with the specific embodiment shown in the attached drawings. For the purpose of summarizing the invention, the invention may be incorporated into a new pocket holder for snelled fish hooks for holding and storing fish hooks with leaders in a simple pocket-sized folder whereby the hook points are covered for safety and the leader lines are secured to prevent kinking and tangling while simultaneously allowing easy removal of the hook without interfering with other stored hooks. The pocket holder for snelled fish hooks comprises a generally rectangular semi-stiff thin panel of plastic having a lateral straight score line thereon defining two adjoining identical panel sections. The panel is foldable on the score line to provide a closed position wherein the panel sections lie adjacent each other in facing touching relationship whereby defining an inside portion therebetween. The panel also has an open position wherein the panel sections extend away from each other, divergently from the score line, for providing access to the inside portion.

Hook retaining means is included whereby the hook is removably secured to the inside portion to preclude the hook point from snagging surrounding objects when the panel is closed. The hook retaining means comprises two pair of parallel spaced apart slits extending through at least one of the panel sections essentially central thereto. The slits define two retaining strips therebetween wherethrough the hook may be inserted.

Further included is leader retaining means whereby the leader is removably secured to the inside portion such that the leader is protected from tangling and kinking. The leader retaining means comprises a pair of spaced apart holes extending through at least one of the panel sections proximal each corner thereof. The holes in each pair of holes are joined together by a slit extending through the panel section, the slit following a generally arcuate path to form a rounded oblong tab coplanar the panel section. Each tab is diagonally aligned relative the panel section such that the tabs lie in opposition to each other. The tabs are inwardly pivotally displaceable relative the plane of the panel section whereby the combination of tabs and panel section define a spool structure whereupon the leader may be wound.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new pocket holder for snelled fish hooks for holding and storing fish hooks with leaders whereby the hook points are covered for safety and the leader lines are secured to prevent kinking and tangling.

It is another object of the present invention to provide a new pocket holder for snelled fish hooks which may be easily and efficiently manufactured and marketed.

It is a further object of the present invention to provide a new pocket holder for snelled fish hooks which is of a durable and reliable construction.

An even further object of the present invention is to provide a new pocket holder for snelled fish hooks which is susceptible of a low cost of manufacture with regard to both materials and labor, and which accordingly is then susceptible of low prices of sale to the consuming public, thereby making such pocket holders for snelled fish hooks economically available to the buying public.

Still yet another object of the present invention is to provide a new pocket holder for snelled fish hooks which provides in the apparatuses and methods of the prior art some of the advantages thereof, while simultaneously overcoming some of the disadvantages normally associated therewith.

Still yet another object of the present invention is to provide a new pocket holder for snelled fish hooks that allows easy removal of a hook without interfering with other hooks stored in the holder.

Yet another object of the present invention is to provide a new pocket holder for shelled fish hooks that is of a size to easily fit a shirt pocket or tackle box.

Even still another object of the present invention is to provide a new pocket holder for snelled fish hooks that can accommodate a plurality of any size fishing hook with any weight or length of leader.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the preferred embodiment of the present invention pocket holder for snelled fish hooks showing the inside of the device in the open position.

FIG. 4 is a perspective view of the invention of FIG. 3 showing the outside of the device in the closed position.

FIG. 7 is a perspective view of an alternate embodiment of the present invention having three sections showing the inside of the device in the open position.

FIG. 8 is a perspective view of the invention of FIG. 7 showing the outside of the device in the closed position.

DESCRIPTION OF THE PREFERRED EMBODIMENT

Figure 1:
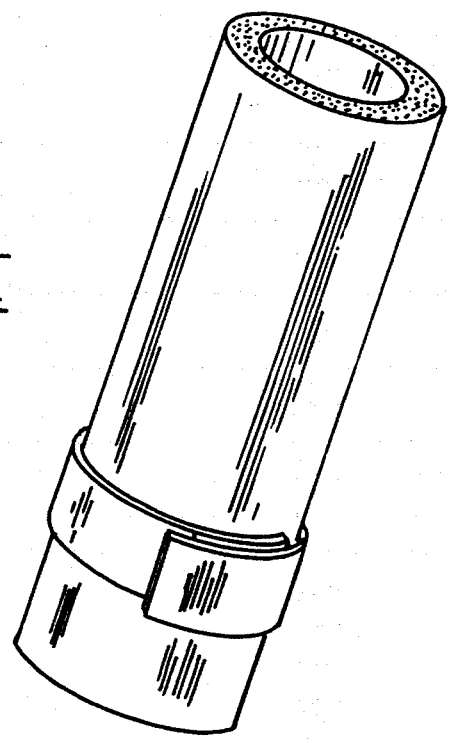
FIG. 1 is an illustration of a prior art fish hook and leader holder.
Figure 2:
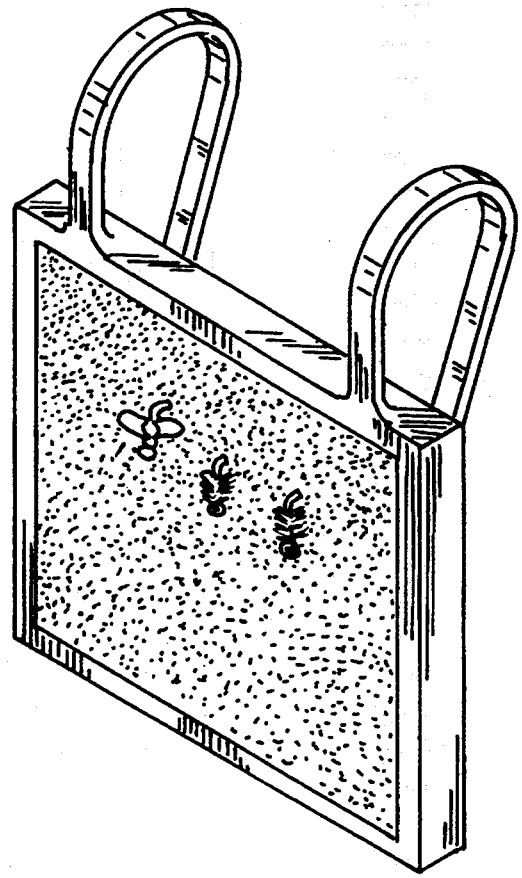
FIG. 2 is an illustration of a prior art fish lure holder.

With reference now to the drawings, and in particular to FIG. 3 thereof, a new pocket holder for snelled fish hooks embodying the principles and concepts of the present invention and generally designated by the reference numeral 10 will be described.

Figure 5:
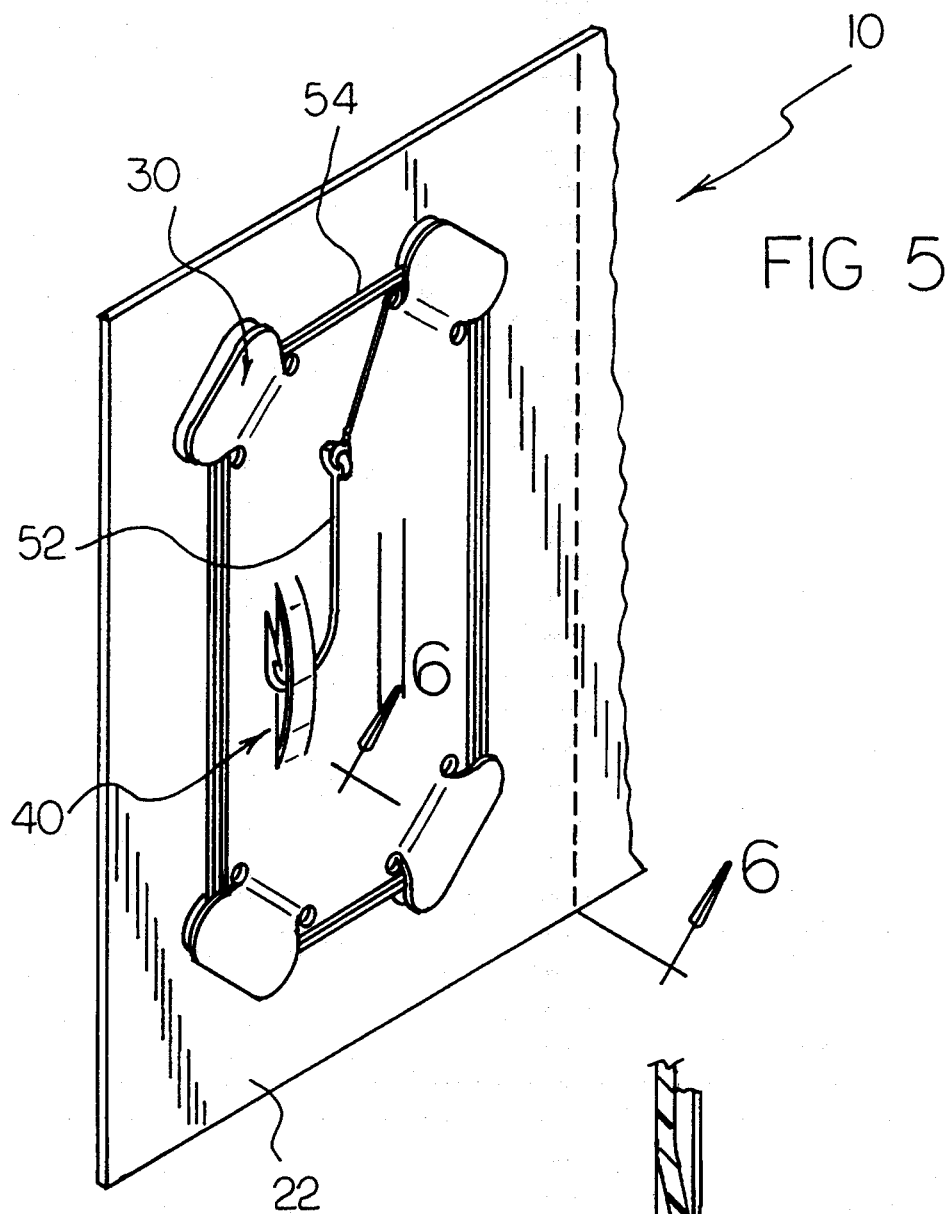
FIG. 5 is a partial perspective view of the invention of FIG. 3 showing the manner of storing a fish hook with leader.
Figure 6:
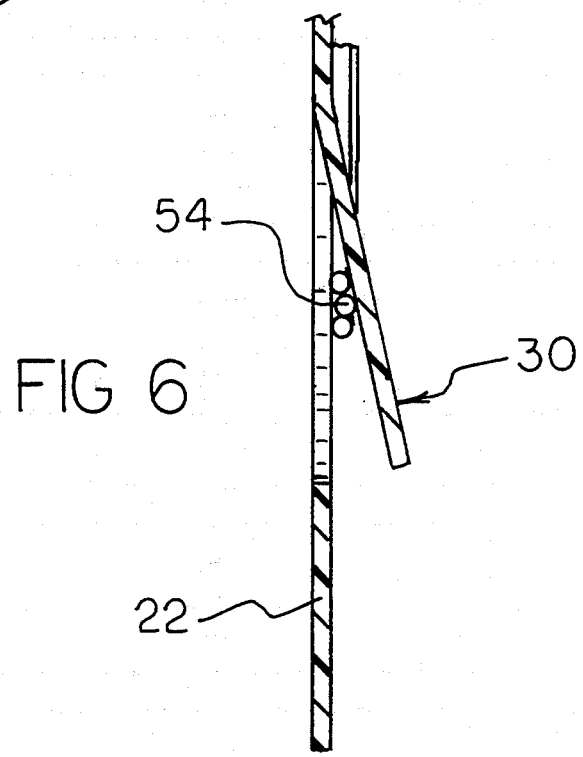
FIG. 6 is a sectional view of the invention of FIG. 5 taken along the line 6—6.

From an overview standpoint, the pocket holder for snelled fish hooks is adapted for use for holding and storing fish hooks with leaders in a simple pocket-sized folder whereby the hook points are covered for safety and the leader lines are secured to prevent kinking and tangling while simultaneously allowing easy removal of the hook without interfering with other stored hooks. See FIG. 5.

With reference now to FIGS. 3–6 and more specifically, it will be noted that a new pocket holder for snelled fish hooks 10 is shown. The pocket holder for snelled fish hooks 10 comprises a generally rectangular semi-stiff thin panel 20 of plastic having a lateral straight score line 24 thereon defining two adjoining identical panel sections 22 and 26. The panel 20 is foldable on the score line 24 to provide a closed position wherein the panel sections 24 and 26 lie adjacent each other in facing touching relationship whereby defining an inside portion therebetween. The panel 20 also has an open position wherein the panel sections 24 and 26 extend away from each other, divergently from the score line 24, for providing access to the inside portion.

Hook retaining means 40 is included whereby the hook 52 is removably secured to the inside portion to preclude the hook point from snagging surrounding objects when the panel 20 is closed. The hook retaining means 40 comprises two pair of parallel spaced apart slits 42 and 44 extending through at least one of the panel sections 22 and 26 essentially central thereto. The slits 42 and 44 define two retaining strips 46 and 48 therebetween wherethrough the hook 52 may be inserted.

Further included is leader retaining means 30 whereby the leader 54 is removably secured to the inside portion such that the leader 54 is protected from tangling and kinking. The leader retaining means 30 comprises a pair of spaced apart holes 32 extending through at least one of the panel sections 22 and 26 proximal each corner thereof. The holes 32 in each pair of holes are joined together by a slit 34 extending through the panel section 22 and 26, the slit 34 following a generally arcuate path to form a rounded oblong tab 36 coplanar the panel section 22 and 26. Each tab 36 is diagonally aligned relative the panel section such that the tabs lie in opposition to each other. The tabs 36 are inwardly pivotally displaceable relative the plane of the panel section 22 and 26 whereby the combination of tabs and panel section define a spool structure whereupon the leader 54 may be wound.

Referring to FIGS. 7 and 8, an alternate embodiment of the new pocket holder for snelled fish hooks, generally designated by the reference numeral 70, is shown. The panel 20 includes an additional score line 74 defining a third panel section 72. The third panel section 72 is identical to the other panel sections 22 and 24 and also has hook retaining means 40 and leader retaining means 30 formed thereon. The panel 20 is foldable on both score lines 24 and 74 to form a tri-fold folder.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A new pocket holder for snelled fish hooks for holding and storing fish hooks with leaders in a simple pocket-sized folder whereby the hook points are covered for safety and the leader lines are secured to prevent kinking and tangling while simultaneously allowing easy removal of the hook without interfering with other stored hooks, the pocket holder for snelled fish hooks comprising:

a generally rectangular semi-stiff thin panel of plastic having a lateral straight score line thereon defining two adjoining similarly-profiled panel sections, the panel being foldable on the score line to provide a closed position wherein the panel sections lie adjacent each other in facing touching relationship whereby defining an inside portion therebetween, the panel also having an open position wherein the panel sections extend away from each other divergently from the score line for providing access to the inside portion;

hook retaining means whereby the hook is removably secured to the inside portion to preclude the hook point from snagging surrounding objects when the panel is closed, the hook retaining means comprising two pair of parallel spaced apart slits extending through at least one of the panel sections essentially central thereto, the slits defining two retaining strips therebetween wherethrough the hook may be inserted; and leader retaining means whereby the leader is removably secured to the inside portion such that the leader is protected from tangling and kinking, the leader retaining means comprising: a pair of spaced apart holes extending through at least one of the panel sections proximal each corner thereof, the holes in each pair of holes being joined together by a slit extending through the panel section, the slit following a generally arcuate path to form a rounded oblong tab coplanar the panel section, each tab being diagonally aligned relative the panel section such that the tabs lie in opposition to each other, the tabs also being inwardly pivotally displaceable relative the plane of the panel section whereby the combination of tabs and panel section defines a spool structure whereupon the leader may be wound.

2. A new pocket holder for snelled fish hooks for holding and storing fish hooks with leaders in a simple pocket-sized folder whereby the hook points are covered for safety and the leader lines are secured to prevent kinking and tangling while simultaneously allowing easy removal of the hook without interfering with other stored hooks, the pocket holder for snelled fish hooks comprising:

a folder wherein a fish hook with leader may be stored, the folder comprising a generally rectangular semi-stiff thin panel having at least one lateral straight score line thereon defining at least two contiguous similarly profiled panel section, the panel being foldable on the score line to provide a closed position wherein the panel sections lie adjacent each other in facing touching relationship whereby defining an inside portion therebetween, the panel also having an open position wherein the panel sections extend away from each other divergently from the score line for providing access to the inside portion;

hook retaining means whereby the hook is removably secured inside the folder to preclude the hook point from snagging surrounding objects when the folder is closed, the hook retaining means comprising two pair of parallel spaced apart slits extending through at least one of the panel sections essentially central thereto, the slits defining a pair of retaining strips therebetween wherethrough the hook may be inserted; and leader retaining means whereby the leader is removably secured inside the folder such that the leader is protected from tangling and kinking, the leader retaining means comprises a pair of spaced apart holes extending through at least one of the panel sections proximal each corner thereof, the holes in each pair of holes being joined together by a slit extending through the panel section, the slit following a generally arcuate path to form a rounded oblong tab coplanar the panel section, each tab being diagonally aligned relative the panel section such that the tabs lie in opposition to each other, the tabs also being pivotally displaceable relative the plane of the panel section whereby the combination of tabs and panel section defines a spool structure whereupon the leader may be wound.

3. The pocket holder for snelled fish hooks of claim 2 wherein a plurality of hooks with leaders may be stored on each panel section, the leaders being wound on top of each other.

4. The pocket holder for snelled fish hooks of claim 3 wherein the panel is constructed of plastic.

5. The pocket holder for snelled fish hooks of claim 4 wherein the panel is constructed of parchment paper.

6. The pocket holder for snelled fish hooks of claim 5 wherein the panel is constructed of cardboard.

* * * * *